March 13, 1928.

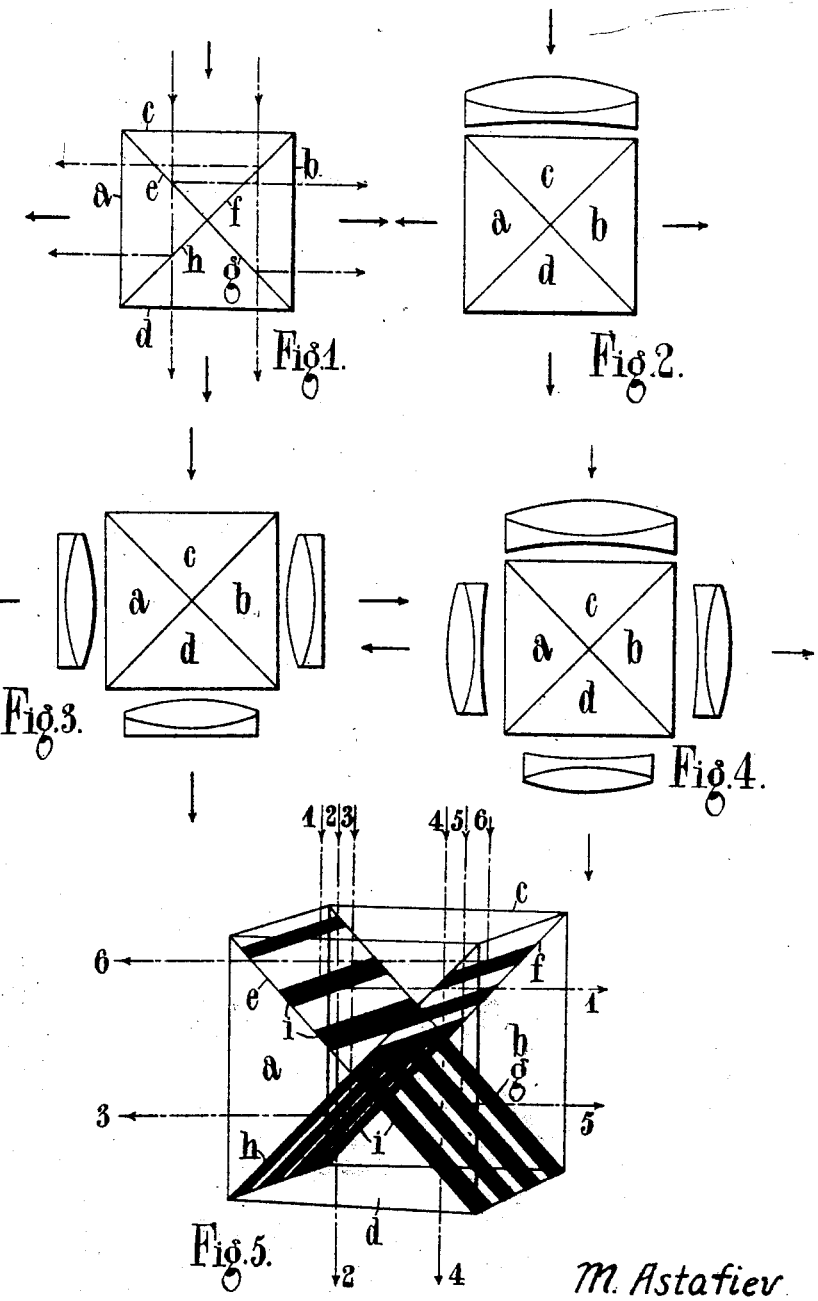

M. ASTAFIEV

OPTICAL SYSTEM

Filed Jan. 21, 1926

M. Astafiev
INVENTOR

BY Marks & Clerk
Attys

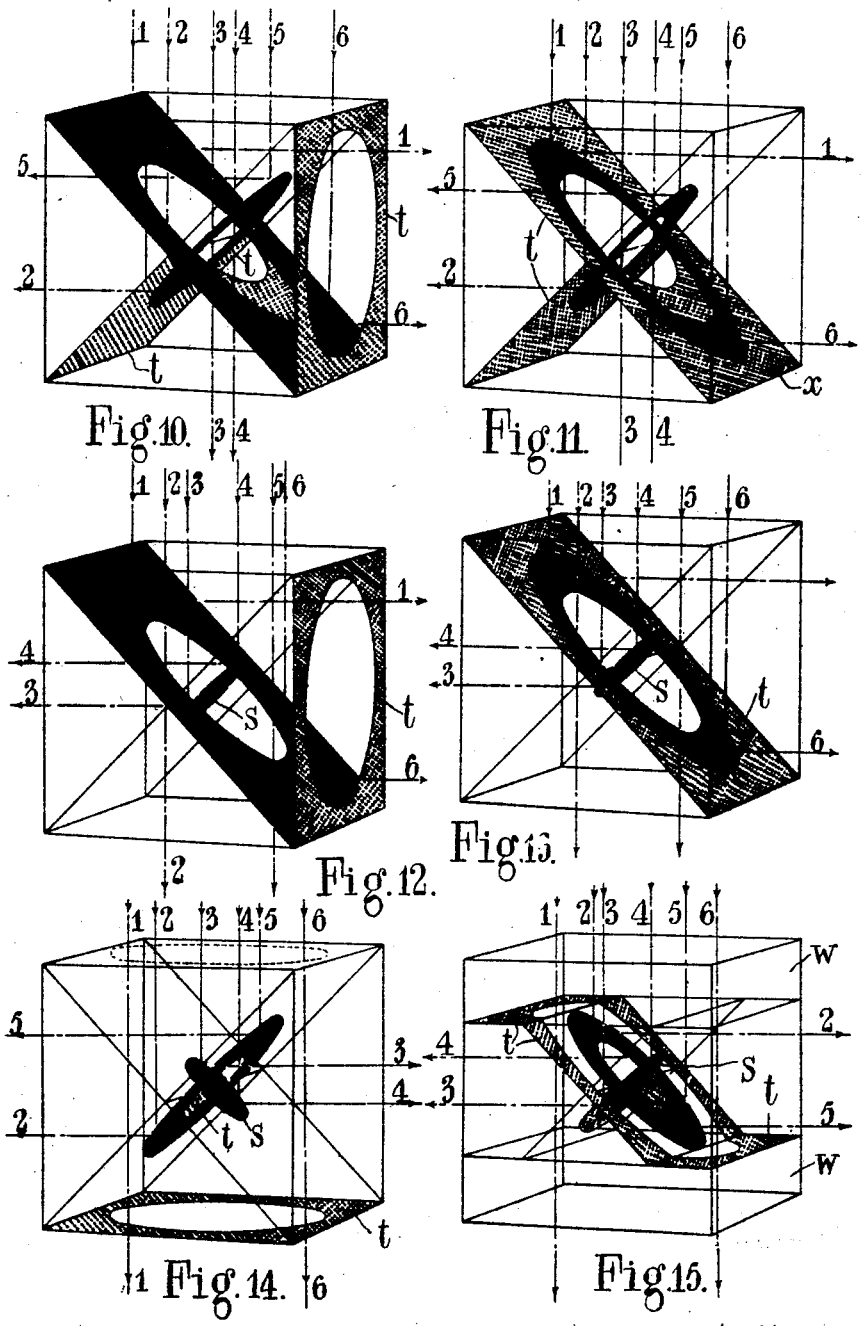

Patented Mar. 13, 1928.

1,662,693

UNITED STATES PATENT OFFICE.

MICHAEL ASTAFIEV, OF CHELSEA, LONDON, ENGLAND.

OPTICAL SYSTEM.

Application filed January 21, 1926, Serial No. 82,805, and in Great Britain January 26, 1925.

This invention relates to improvements in optical systems. It is particularly suitable for three-colour photographic cameras of the type utilizing a plurality of triangular prisms assembled to form a cube, which is situated in the vicinity of the objective.

The object of the invention is the provision of an improved arrangement of the reflecting media situated on the intersecting planes within the cubical prism to permit of equal illumination over the area of the image.

The invention consists in positioning the reflecting media within an optical system of the type indicated, so that the passage of rays therethrough is obstructed as little as possible.

The invention further consists in positioning the reflecting media within an optical system of the type indicated, so that rays entering the prism, if reflected, are reflected only once before emergence from the system.

The invention further consists in the provision in an optical system of the type indicated of reflecting media of strip, annular or other form of varying width.

The invention further consists in treating the intersecting planes within the cubical prism in such manner that extraneous reflections are prevented.

The invention also consists in the improvements in optical systems of the type indicated, substantially as hereinafter described with reference to the accompanying drawings.

In order that the carrying of the invention into effect may be understood, reference will now be made to the accompanying drawings, in which:—

Figures 1 to 4 illustrate a prismatic optical system of the kind forming the subject matter of the present invention, and its disposition relatively to an objective or objectives, having suitable characteristics for their respective functions.

Figures 5 to 8 illustrate various modifications of the invention employing reflecting media of approximately strip form.

Figures 9 to 15 illustrate various modifications of the invention of the kind employing reflecting media of approximately annular or semi-annular form.

In these figures, it should be noted that the clear parts are intended to represent transparent parts, the speckled parts or areas opaque parts, and the intense black areas are intended to represent parts of a reflecting nature.

In carrying the invention into effect in a form to satisfy the requirements of the system shown in Figures 1 to 4, and illustrated by way of example in Figures 5 to 8, I provide a plurality of triangular prisms $a$, $b$, $c$, $d$, and assemble them as is customary in optical systems of the type indicated and produce on the intersecting planes $e$, $f$, $g$, $h$, within the cubical prism a plurality of strips $i$ (Figures 5 and 6) of reflecting media and position them so that rays entering the prism, if reflected, are reflected only once before reaching the sensitive photographic surface or other screen. To emphasize this feature, in Figures 5 to 15 the lines indicated by the numerals 1, 2, 3, 4, 5, 6, represent light rays entering and leaving the cubical prism, arrows being used to indicate the direction in which the light enters and leaves the prism. The aforesaid reflecting media $i$ may be produced by ruling lines, or by any other convenient method, to satisfy the requirements regarding the relative proportions of reflecting and transparent media hereinafter indicated. Alternatively, the reflecting media or grids may comprise suitably supported pierced metallic elements, or the reflecting media may be carried on a suitable supporting material for example glass, celluloid, gelatine, or other transparent support, and they may, if desired, be immersed in a liquid such as oil or turpentine. Diffusion may be introduced into the images by modifying the transparency of the support.

In the preferred form of disposition of the reflecting media, the reflecting surface is not disposed in the immediate vicinity of the central zone of the prism. This is shown in Figure 6 (at $j$) and in Figures 8, 9, 10 and 11, which illustrate modifications of the invention incorporating this feature.

Figures 6, 7:
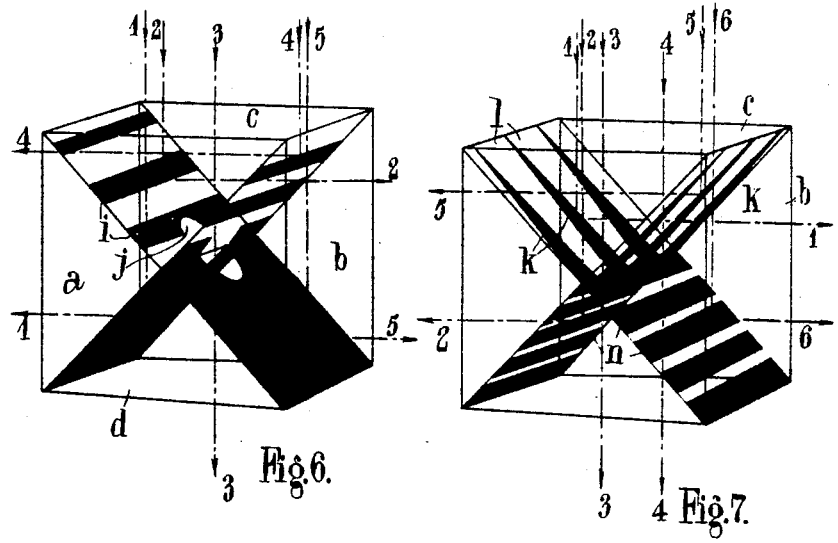
Figures 8, 9:
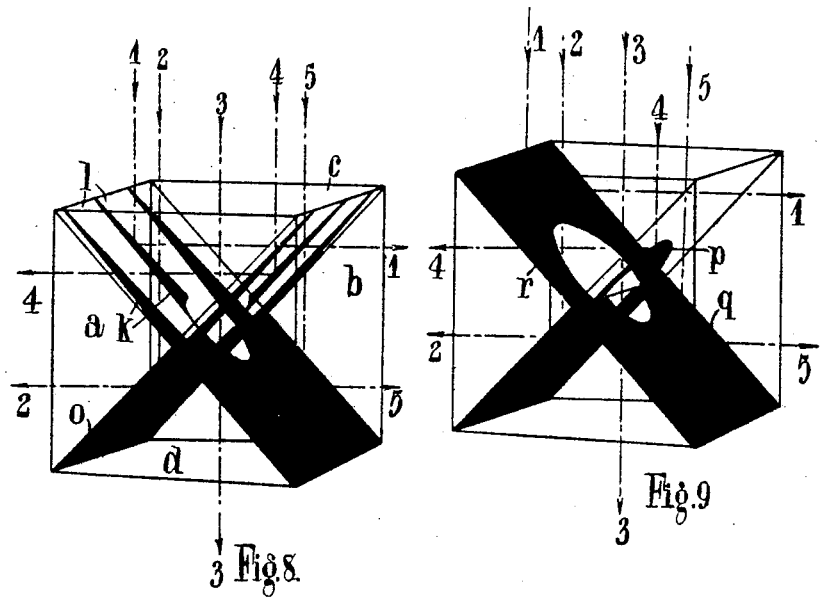

In a modification of the invention as illustrated in Figures 7 and 8, I provide reflecting media and support them in the manner indicated above but arrange for the reflecting media $k$ to be of varying width. In the specific example shown in Figures 7 and 8, the reflecting media $k$ comprise a number of strips having their longitudinal axes arranged parallel one to another. The strips are broader near the line where the planes formed by uniting the prisms intersect, and are narrower towards the edges of the prism.

The spaces *l* between the strips *k* are narrower near the said line of intersection and broader nearer the edges of the prism. In the modification shown in Figure 8, the strips *k* are of varying width and extend across the whole of the supporting surface, but they may extend across only a part thereof. In the latter case, the strips are arranged in zigzag formation. As indicated above, it is preferred that there be no reflecting media in the immediate vicinity of the central zone of the prism. Rays then have a comparatively unobstructed path therethrough.

Reference to the drawings will show that the reflecting media *n* at the lower part of the prism shown in Figure 7 are of a different form from that shown at *o* in Figure 8. Furthermore, it will be observed that in Figures 5 and 7 the strips of reflecting media at the upper part of the prism have in plan view their axes lying at right angles to the axes of the media in the lower half of the prism. Furthermore, Figures 7 and 8 illustrate strips of media in the upper part of the prisms having their axes lying in different directions. These modifications are introduced into the drawings to emphasize the universal application of this invention.

In a further modification of the invention and as illustrated in Figure 9, the reflecting media *p*, *q*, *r*, are of annular or semi-annular form, the width of the reflecting surface being constant or variable according to requirements. It will be observed that the reflecting surfaces are arranged concentrically but when of semi-annular form, as shown specifically in Figure 9, are arranged to abut against semi-annular surfaces of non-reflecting media. Alternatively, the reflecting surface or strip may be in the form of a spiral.

Further modifications of this form of the invention are shown in Figures 10 to 15, though in Figures 12 to 15 reflecting media *s* is deposited in the central zone on one of the intersecting planes. It will be observed that the intersecting planes carrying the reflecting media in all the figures in elevation form the letter X.

In Figures 10 to 15, a further feature is introduced to assist in the scheme of producing an evenly illuminated image. To prevent extraneous reflections, the parts *t* of the intersecting planes and ends of the prism which are not to remain transparent, and which are not treated to form reflectors, are suitably treated for this purpose, for example by blackening with suitable material. These surfaces, in addition to being non-reflecting, are opaque. As previously indicated, the clear parts of these figures are intended to represent transparent parts, the speckled parts or areas opaque parts, and the intense black areas are intended to represent parts of a reflecting nature.

In all modifications, it is preferred that a reflecting surface should not be deposited in the immediate vicinity of the central zone of the prism. The relative proportions of the reflecting and transparent media are designed for a particular light intensity or ratio of light intensity by a formula in which the ratios of reflecting surface to non-reflecting surface are a function of:—

(*a*) Angle of field of view of objective;
(*b*) Focal distance of the front lens of objective (when system is placed inside complex objective in place of diaphragm);
(*c*) Coefficient of refraction of glass of the prisms or support;
(*d*) Coefficient of absorption of light in different portions of spectra when rays are reflected from, for example, silver and glass surfaces;
(*e*) Coefficient of absorption of light in given glass medium or other support.

The principal advantages to be gained from the particular optical system herein described are:—

(1) That the rays are given a comparatively free path throughout the system, thus avoiding serious loss of light intensity at the sensitive surfaces;
(2) That shadows of the reflecting media are not so intense upon the photographic plate owing to the fact that the objective can be close to the reflecting media;
(3) That the shadows cast by the strips can be made to disappear completely by placing the system within a complex objective in place of the diaphragm. The concentric and like arrangements of the reflecting media are preferable because the spherical aberration of the objective is thereby eliminated by reason of each separate image receiving rays from a more or less narrow concentric ring, and not from the whole surface of the lens. Objectives of large aperture may be used if desired.

It is obvious that further modifications of the invention are possible. For example, triangular prisms may be situated adjacent to or near the cubical prism for the purpose of reflecting the rays, or the rays emanating from the cubical prism may first pass through the lens system or systems before passing to the sensitive photographic surfaces or to the reflecting or refracting prisms, and as shown in Figure 15, supplementary prisms *u* may be utilized for protecting part of the opaque and reflecting media which may otherwise be in an exposed position. In Figure 15, the supplementary prisms *u* protect part of the opaque surfaces *t*.

Having now described my invention, what I claim as new and desire to secure by Letters Patent is:—

1. An optical system having in combination a plurality of differently facing reflecting means disposed in and around the line of intersection of a pair of planes crossing each other and each similiarly inclined to a plane normal to the system and containing said line of intersection, the reflecting means in one of said crossing planes and on one side of said normal plane being dissimilar in disposition from the reflecting means in the other crossing plane and on the same side of said normal plane and being disposed out of line with the reflecting means on said other crossing plane on the other side of said normal plane.

2. An optical system having in combination a plurality of differently facing reflecting portions of an annular form which are disposed in planes intersecting substantially at right angles and which are arranged one within the other substantially concentrically about a point adjacent to the line of intersection of said planes, a light-transmitting opening having a substantially circular outline when viewed along the normal to the system, said opening being disposed adjacent to the centre of the system and being bounded at least in part by a border of one of said reflecting portions, and means for controlling the intensities of illumination of the images formed by portions of the divided light beam leaving said reflecting portions and that part of said beam passing directly through the system.

3. An optical system having in combination the features indicated in claim 2, in which means are provided for overcoming the variation in intensity of illumination from one region to another of at least one of the images formed, such variation being due to the obliquity of the light-dividing means to the normal to the system, said means comprising at least one opaque portion interfering with the passage of the image-forming beam in such a manner as substantially equalizes the cross-sectional area of said beam emerging from the system and originating from various positions over the usual angle of vision of such systems.

4. An optical system having in combination the features indicated in claim 2, in which means are provided for overcoming the variation in intensity of illumination from one region to another of the image formed by at least one of the reflected portions of the main beam, said means being at least in part comprised of an annular-shaped opaque non-reflecting area occupying a plane situated at an angle not greater than 45° to the plane containing the respective reflecting portion and on the side thereof facing the field of vision, said opaque area having such magnitude and disposition that part of the light beam emanating from that region of the field of vision from which incident rays to the system are more nearly at right angles to the plane of the said reflecting portion is prevented from passing completely through the system.

5. An optical system as claimed in claim 2, in which means are provided for overcoming the variation of intensity of illumination from one region to the other of the image formed by that part of the light beam which passes directly through the system in the vicinity of the centre thereof, such variation being due to the obliquity of the light-dividing means to the normal to the system, said means comprising an opaque non-reflecting portion of crescent-like configuration occupying the same plane as and bounded in part by the most centrally-disposed border of the outermost reflecting portion, the remainder of the periphery of said opaque portion being so arranged as to prevent complete passage through the system of that part of the light beam passing through a central opening bounded by a border of the innermost reflecting portion and which emanates from that region of the field of vision from which incident rays to the system are more nearly at right angles to the plane containing said innermost reflecting portion.

6. The application of the optical system claimed in claim 2 to the production of three-coloured photographs and the like where a plurality of images of the same object having predetermined relative general intensities and even illumination over the full width of any of the said images is required.

7. In combination in light-dividing and apportioning apparatus a plurality of similar light transmitting triangular prisms assembled together to form a cube, reflecting and transmitting regions on the planes formed by the interfaces of said cube and opaque non-reflecting regions within said cube and on said interfaces.

In testimony whereof I have signed my name to this specification.

MICHAEL ASTAFIEV.